US009868454B2

(12) United States Patent
Tione (10) Patent No.: US 9,868,454 B2
(45) Date of Patent: Jan. 16, 2018

(54) PNEUMATIC BRAKE SYSTEM REDUNDANCY IN LOCOMOTIVE CONSISTS

(71) Applicant: FAIVELEY TRANSPORT ITALIA S.P.A, Piossasco (Turin) (IT)

(72) Inventor: Roberto Tione, Lauriano (IT)

(73) Assignee: FAIVELEY TRANSPORT ITALIA S. p. A., Piossasco (Turin) (IT)

( * ) Notice: Subject to any disclaimer, the term of this patent is extended or adjusted under 35 U.S.C. 154(b) by 57 days.

(21) Appl. No.: 14/038,177

(22) Filed: Sep. 26, 2013

(65) Prior Publication Data
US 2015/0083529 A1    Mar. 26, 2015

(51) Int. Cl.
| | |
|---|---|
| *B61H 13/20* | (2006.01) |
| *B61H 13/02* | (2006.01) |
| *B61C 17/12* | (2006.01) |
| *B61H 11/00* | (2006.01) |
| *B60T 17/22* | (2006.01) |
| *B60T 13/66* | (2006.01) |

(52) U.S. Cl.
CPC ............ *B61H 13/20* (2013.01); *B60T 13/665* (2013.01); *B60T 17/228* (2013.01); *B61C 17/12* (2013.01); *B61H 11/00* (2013.01); *B61H 13/02* (2013.01)

(58) Field of Classification Search
CPC ...... B60T 13/66; B60T 13/665; B60T 17/228; B60T 2270/40; B60T 2270/403; B60T 7/085; B61C 17/12; B61H 11/00; B61H 13/02; B61H 13/20
See application file for complete search history.

(56) References Cited

U.S. PATENT DOCUMENTS

| | | | |
|---|---|---|---|
| 4,582,280 A * | 4/1986 | Nichols .................. | B60L 15/32 |
| | | | 105/61 |
| 5,907,976 A | 6/1999 | Santoro, Jr. et al. | |
| 6,401,015 B1 | 6/2002 | Stewart et al. | |
| 8,380,413 B2 * | 2/2013 | Smith ................... | B60T 13/665 |
| | | | 246/187 C |
| 2010/0094489 A1 * | 4/2010 | Moffitt ................. | B60T 13/665 |
| | | | 701/20 |

(Continued)

OTHER PUBLICATIONS

Communication dated Jun. 5, 2017, issued by the Australian Patent Office in corresponding Australian Application No. 2014326923.

*Primary Examiner* — Anna M Momper
(74) *Attorney, Agent, or Firm* — Sughrue Mion, PLLC (57) ABSTRACT

A train consist for freight transportation includes a first or lead locomotive and at least one second or trail, adjacent locomotive directly connected with one another, followed by a plurality of cars or wagons.
Each of the locomotives has an Electronically Controlled Pneumatic Brake System (ECPBS), a brake handle installed in the driver's cab providing electric signals to control the ECPBSs upon train operator's commands, and a communication layer used to transmit various signals between the two or more adjacent locomotives of the consist.
The electrical signals generated by the brake handle in the lead locomotive are extended to at least the first trail locomotive through the communication layer in order to control the ECPBS in the trail locomotive, providing full train brake redundancy, allowing non-degraded train operation even in case of an unrecoverable failure of the brake control system in the lead locomotive.

4 Claims, 7 Drawing Sheets

(56) References Cited

U.S. PATENT DOCUMENTS

2010/0256842 A1* 10/2010 Liberatore ............ B60T 13/665
                                                        701/19
2012/0265379 A1    10/2012 Chen et al.
2013/0018560 A1*   1/2013 Smith ................... B60T 13/665
                                                        701/70
2013/0297163 A1*  11/2013 Kull ......................... B60T 7/18
                                                        701/70

* cited by examiner

PNEUMATIC BRAKE SYSTEM REDUNDANCY IN LOCOMOTIVE CONSISTS

BACKGROUND OF THE INVENTION

The present invention generally relates to pneumatic braking systems for railway trains, and in particular to pneumatic braking systems for locomotive consists.

A train consist for freight transportation includes at least first and second adjacent locomotives, directly connected with each other, followed by a plurality of interconnected cars or wagons. The very first locomotive of such a consist is named the lead locomotive, whereas the at least one further locomotive of the consist is named a trail locomotive.

In modern trains for freight transportation each locomotive of such a consist is provided with an Electronically Controlled Pneumatic Brake System (hereinafter referred to as the ECPBS) and a brake control handle device installed in the driver's cab provides electric control signals to the ECPBS in accordance with the commands by the train driver.

The current state of the art in American freight railways operation, despite the coming introduction of the new ECP (Electronically Controlled Pneumatic) technology and the long lasting Radio Distributed Power technology (the Locotrol" system of "General Electric"), is still mostly based on train consists formed of multiple adjacent locomotives pulling a plurality of connected cars, wherein the whole train braking effort is exclusively managed by the ECPBS of the lead locomotive, controlling the pressure in the brake pipe extending through the whole train consist, according to the electric signals from the brake handle of the lead locomotive. According to the pressure variations, the pneumatic brake system of each wagon or car will individually apply a retardation effort contributing to brake, slow down and stop the whole train.

In case of a critical failure occurring in the ECPBS in the lead locomotive, the whole train can result unable to properly brake, requiring procedures and actions to rescue the train, or to replace the failing lead locomotive with an efficient one, for instance by exchanging the positions of the lead and the trail locomotives.

SUMMARY OF THE INVENTION

The present invention generally relates to:
a railway electronically-controlled pneumatic brake system, ECPBS, controlling the pressure in the brake pipe extending along a train consist;
a lead locomotive brake handle, providing brake commands as electrical signals, coupled to the ECPBSs of the lead locomotive and of at least the first trail locomotive of the consist, through a communication layer extending through at least the first two locomotives in the train consist; and
a method for individually enabling/disabling the ECPBSs in the lead locomotive and in at least the first trail locomotive, said ECPBSs being connected to the lead locomotive brake handle through a communication link to control the braking pressure in the brake pipe according to electrical signals from the brake handle of the lead locomotive.

In a train consist according to the present invention, in case of a critical failure occurring to the ECPBS in the lead locomotive, signals provided by the brake handle of the lead locomotive can be extended to the ECPBS of the first adjacent trail locomotive, through a communication link extending through at least the first two adjacent locomotives of the consist, either by using spare pins on an already available AAR Multi-Unit (hereinafter MU) connector, or by using power line technology over MU pins, or by using a dedicated custom connector.

In this way, the pneumatic brake system of the adjacent trail locomotive, still controlled through the electric signals from the brake handle in the lead locomotive, will take over control from the failing ECPBS of the lead locomotive, allowing the train to reach the end of service without major inconveniences to the operation thereof.

BRIEF DESCRIPTION OF THE DRAWINGS

Further features and advantages of the present invention will become apparent from the following description of embodiments, provided with reference to the annexed drawings, wherein.

DETAILED DESCRIPTION OF PREFERRED EMBODIMENTS

Figure 1:
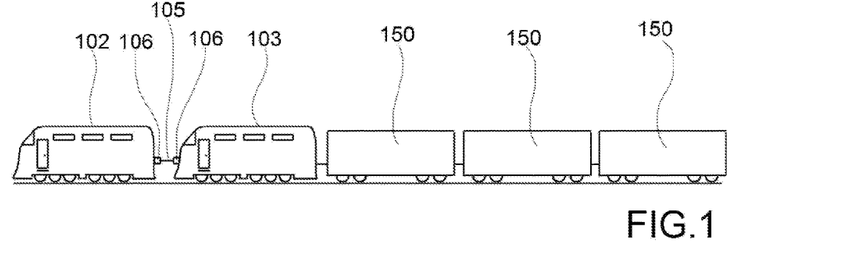
FIG. 1 is a diagrammatic representation of a train including a train consist formed of a lead locomotive and one trail locomotive.

FIG. 1 shows a conventional train consist 101 formed of two adjacent locomotives 102 and 103 pulling a plurality of wagons 150.

Lead locomotive 102 delivers pneumatic brake commands to trail locomotive 103 through a brake pipe and Multiple Unit commands through MU connectors 106 and a cable 105.

The lead locomotive 102 is that from which the train operator controls the operational modes of the whole train consist 101. In particular, from the lead locomotive 102 the train operator controls the brake operational modes of the whole train consist 101.

According to the present invention, a general locomotive braking architecture and related possible implementations are disclosed, allowing the train operator to operate the train brake operational modes by using the brake handle of the lead locomotive, which is able to control either the brake system installed on the lead locomotive 102 or the brake system installed on the trail locomotive 103, selecting which of the two brake systems is to be activated, depending upon the "health" status of the lead locomotive brake system.

Figure 2:
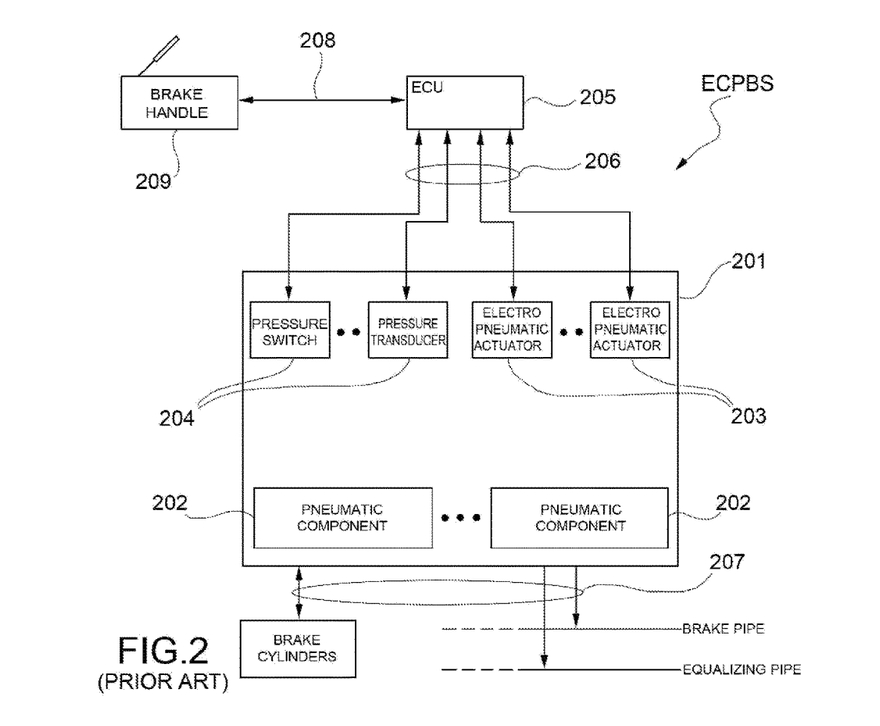
FIG. 2 is a block diagram showing the structure of an ECPBS according to the prior art.

FIG. 2 shows an example of current state of the art ECPBS, comprising a pneumatic manifold 201, on which one or more pneumatic components 202 (such as, for example, relay valves, check valves, triple valves or distributor valves), electro-pneumatic actuators 203 (such as, for example, solenoid valves and proportional solenoid valves), and sensors 204 (such as, for example, pressure switches and pressure transducers) are installed, and controlled by a stand-alone electronic control unit (ECU) 205 through cables 206 wired in any of possible different fashions.

The pneumatic manifold 201 is connected to brake cylinders, a brake pipe and an equalizing pipe, through piping connections 207.

The stand-alone electronic control unit 205 receives brake commands through electrical cables 208 from brake handle 209.

The signals flowing through electrical cables 208 can be of analog type (such as, for example, currents of 4-20 mA), encoded digital type signals, Pulse-Width-Modulation type signals, Data-Communication type signals (such as, for example, CAN, or Echelon, or RS485, or Ethernet signals).

A single failure, for instance in the stand-alone electronic control unit 205, or in the electrical cable 208, can irreparably prevent the ECPBS from properly controlling the pressure in the brake pipe, causing the train operation to stop and requiring rescue.

Figure 3:
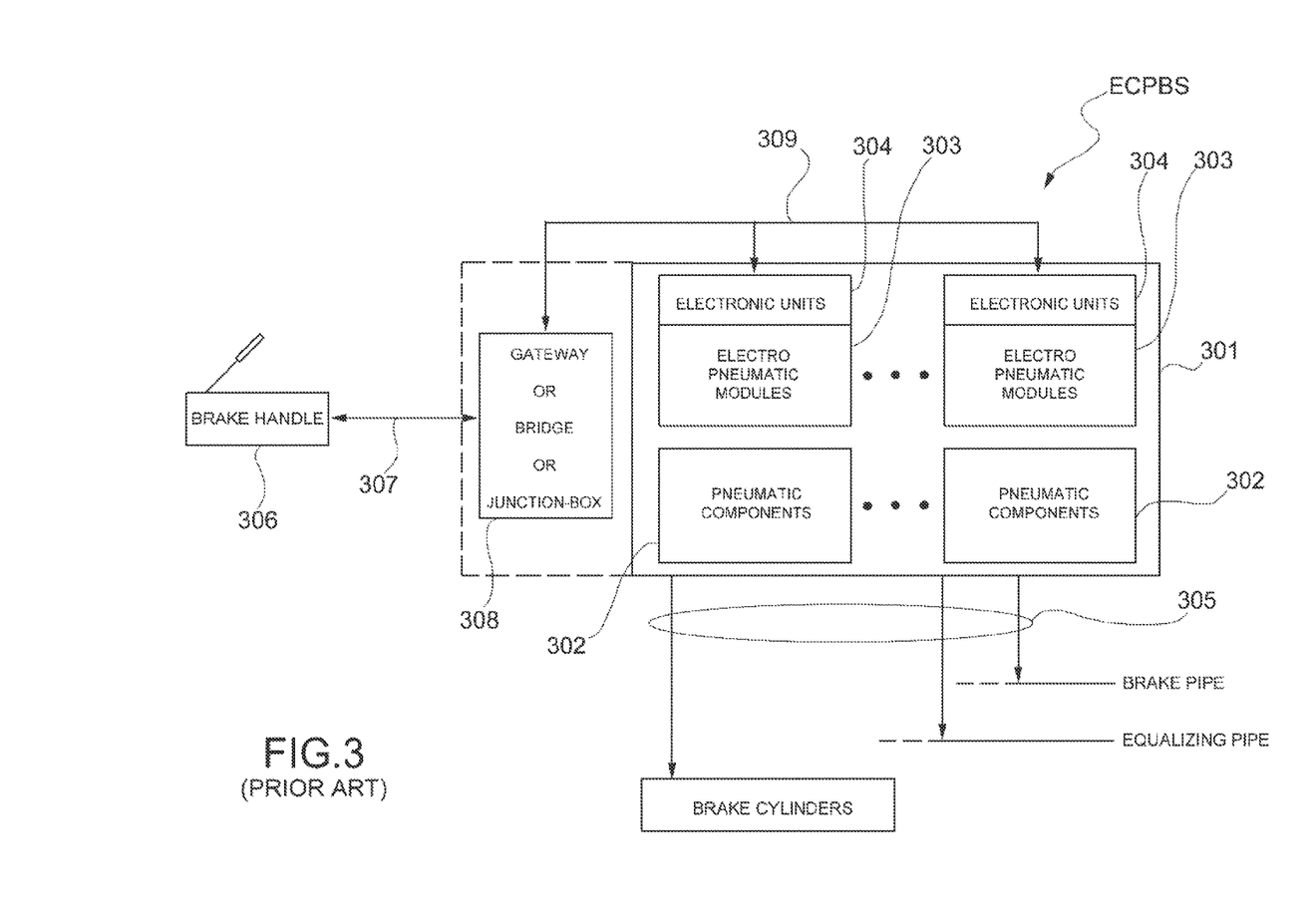
FIG. 3 shows the structure of another ECPBS according to the prior art.

FIG. 3 shows an example of current state of the art ECPBS, comprising a pneumatic manifold 301, on which one or more pneumatic components 302 (such as, for example, relay valves, check valves, triple valves or distributor valves) and electro-pneumatic modules 303 controlled by integrated electronic units 304 (such as, for example, mecha-tronic or pneuma-tronic line replaceable units) are installed.

The pneumatic manifold 301 is connected to brake cylinders, the brake pipe and an equalizing pipe, through piping connections 305.

A brake control handle device 306 sends brake commands via electrical cables 307 to an electronic interface module 308 (such as, for example, a gateway, or a junction-box, or a bridge) which forwards brake commands to the integrated electronic units of modules 304 via electrical cables 309.

The signals flowing through electrical cables 307 can be of analog type (such as, for instance, currents of 4-20 mA), encoded digital type signals, Pulse-Width-Modulation type signals, or data-communication type signals (such as, for example, CAN signals, Echelon signals, RS485 signals, Ethernet signals).

Also the signals flowing through electrical cables 309 can be a combination of analog signals, encoded digital signals, Pulse-Width-Modulation type signals and data-communication signals.

According to various solutions, the electronic interface module 308 can be installed on the brake manifold 301, or can be stand-alone.

A single failure, for example in the electronic interface module 308 or the electrical cable 307, can irreparably prevent the ECPBS from properly controlling the pressure in the brake pipe(s), causing the train operation to stop and requiring rescue.

Figure 4:
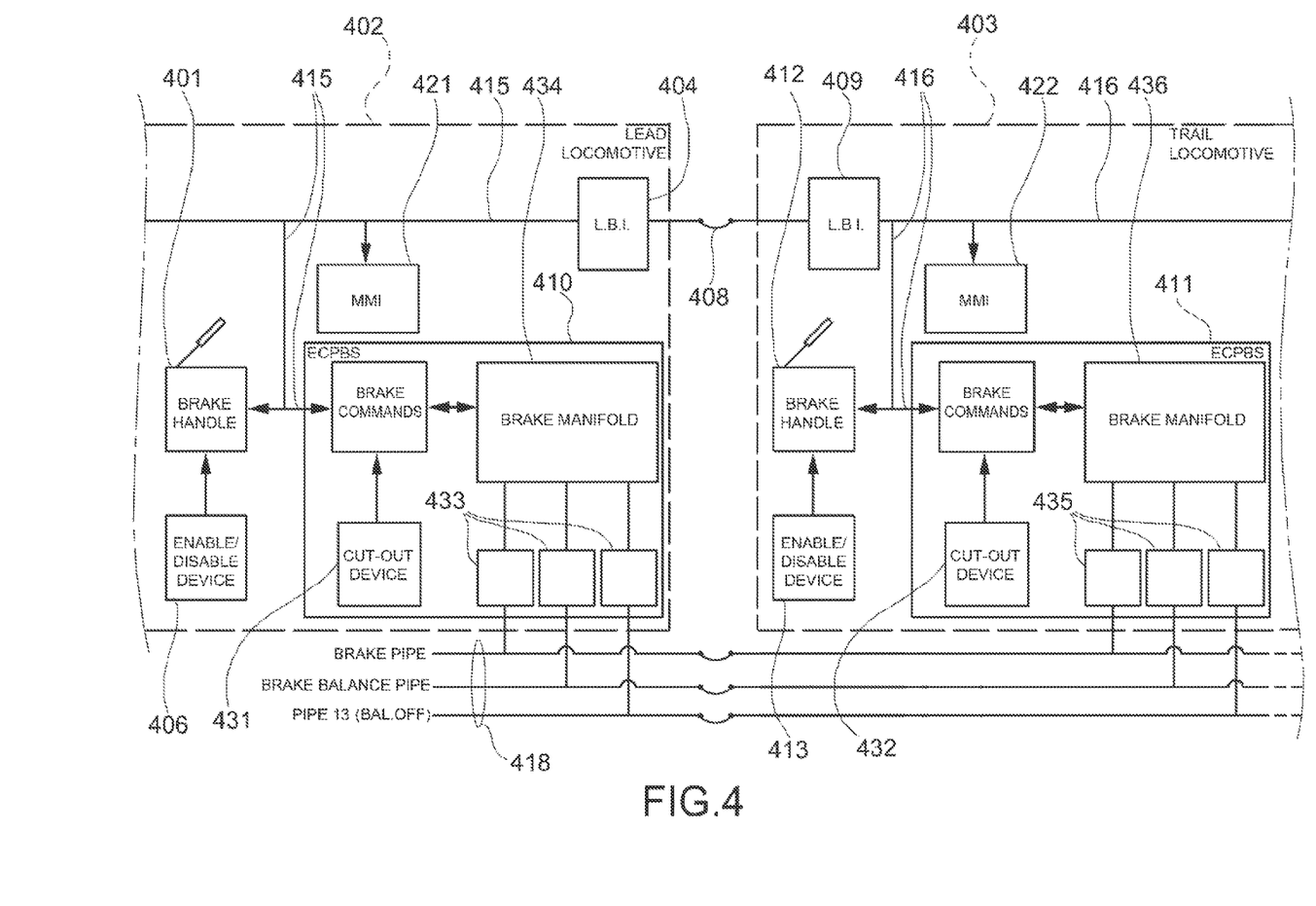
FIG. 4 is a block diagram showing a structure of an ECPBS for use in a train consist according to the present invention.

Embodiment of FIG. 4

FIG. 4 shows a Multiple Unit Brake System architecture for a train consist according to the present invention, including:

at least two adjacent locomotives, i.e. lead locomotive 402 and trail locomotive 403;

lead locomotive brake apparatus, comprising a brake control handle device 401 and a related enable/disable device 406, and an Electronically Controlled Pneumatic Brake System (ECPBS) 410;

trail locomotive brake apparatus, comprising a brake control handle device 412 and a related enable/disable device 413, and an Electronically Controlled Pneumatic Brake System (ECPBS) 411;

braking pipes 418; and a communication layer, including communication links 415 and 416, locomotive brake interfaces (LBI) 404 and 409 and a locomotive interconnection cable 408.

Electrical commands from the brake control handle device 401 can reach the ECPBS 411 through said communication layer: the train operator can control the brake pipe pressure from the brake handle 401 of the lead locomotive, by controlling the ECPBS 411, should the ECPBS 410 in the lead locomotive irreparably fail.

With the architecture shown in FIG. 4 the brake handle 401 available on the lead locomotive 402 physically forwards brake commands to the ECPBS 410 of the lead locomotive and the locomotive brake interface 404, through the communication link 415 (which is, for example, a LON network, or a CAN network, or an encoded digital signal network or an analog signal network).

The enable/disable device 406 (such as a switch) is used to enable or disable the brake handle 401 to selectively allow or prevent it from delivering brake commands on the communication link 415.

The locomotive brake interface 404 is a device in charge of transferring the brake commands from the lead locomotive 402 to the trail locomotive 403 through the locomotive interconnection cable 408.

In the trail locomotive 403 the locomotive brake interface 409 receives brake commands through the locomotive interconnection cable 408 and transfers such brake commands to the communication link 416.

The communication link 416 transfers the brake commands to the ECPBS 411. A brake control handle device 412 is connected to the communication link 416. An enable/disable device 413, such as a switch, is used to enable or disable the brake handle 412 in the trail locomotive 403, to selectively allow or prevent it from delivering brake commands to the communication link 416.

In the lead locomotive 401 an active/cut-out device 431 is used to enable or disable the ECPBS 410 to react to the brake commands issued over the communication link 415.

Similarly, in the trail locomotive 403 an active/cut-out device 432 is used to enable or disable the ECPBS 411 to react to brake commands received through the communication link 416.

In the lead locomotive 402 one or more pneumatic devices 433 (such as, for example, pneumatic cocks or pneumatic valves) are used to connect or isolate the brake manifold 434 from one or more brake pneumatic pipes 418, such as, for example, a brake pipe, a brake balance pipe and an additional pneumatic pipe 13.

In the trail locomotive 403 one or more pneumatic devices 435, such as for example pneumatic cocks or pneumatic valves, are used to connect or isolate the brake manifold 436 from the pneumatic brake pipes 418.

A Man-Machine Interface (MMI) 421, comprising for instance a display or a screen, is connected to the communication link 415 to show information related to the ECPBSs 410 and 411, such as brake commands and/or diagnostic information received from the ECPBSs 410 and 411. A similar MMI 422 is provided on board the trail locomotive 403.

Normal Operation

According to the present invention and with reference to the architecture shown in FIG. 4, when the ECPBS 410 in the lead locomotive 402 is fully operable and exempt from any failures that could prevent the train consist from properly operating, the enable/disable device 406 is set to enable the brake handle 401 to deliver brake commands over the communication link 415, and the active/cut-out device 431 is set to enable the ECPBS 410 to operate in accordance with the brake commands issued by the brake handle 401 over the communication link 415. The pneumatic devices 435 are set in the condition in which they couple the brake manifold 434 to the pneumatic pipes 418 allowing the ECPBS 410 to properly control the braking pressure corresponding to the commands issued from the brake handle 401.

The enable/disable device 431 is instead set to disable the brake handle 412 in the trail locomotive, which is prevented from delivering brake commands over the communication link 416; the active/cut-out device 432 is set to disable the ECPBS 411, preventing it from operating upon brake commands received over the communication link 416. The pneumatic devices 435 are set in the condition in which they isolate the brake manifold 436 from the pneumatic brake pipes 418, preventing the ECPBS 411 from influencing the pressures in the pneumatic brake pipes 418.

Man-Machine Interface 421 in the lead locomotive 402 displays functional and diagnostic information from the ECPBS 410 and diagnostic/health information received from the ECPBS 411 through communication link 416, locomotive brake interface 409, locomotive interface cable 408, locomotive brake interface 404 and communication link 415.

Failure Mode Operation

With reference to the architecture shown in FIG. 4, when the ECPBS 410 in the lead locomotive 402 is affected by one or more failures preventing the train consist from properly operating, the enable/disable device 406 is set to enable the brake handle 401 to deliver brake commands over the communication link 415, and the active/cut-out device 431 is set to disable the ECPBS 410 preventing it from operating upon brake commands issued by the brake handle 401 over the communication link 415; the pneumatic devices 433 are set in the condition in which they isolate the brake manifold 434 from the brake pneumatic pipes 418, preventing the ECPBS 410 from influencing the pressures in said pneumatic pipes 418.

The enable/disable device 413 in the trail locomotive 403 is set to disable the brake handle 412, preventing it from delivering brake commands over the communication link 416. The active cut-out device 432 is set to enable the ECPBS 411 to operate according to brake commands received over the communication link 416; the pneumatic devices 435 are set in the condition in which they connect the brake manifold 436 to the brake pipes 418, allowing the ECPBS 411 to control the pressures in said pipes 418 in accordance with the brake commands received from the brake handle 401 of the lead locomotive 402 through the communication link 415, the locomotive brake interface 404, the locomotive interconnection cable 408, the locomotive brake interface 409 and the communication link 416.

Man-Machine Interface 421 in the lead locomotive 402 displace diagnostic/health information received from the ECPBS 410 and functional and diagnostic information from the ECPBS 411 through communication link 416, locomotive brake interface 415, locomotive interface cable 408, locomotive brake interface 404 and communication link 415.

Figure 5:
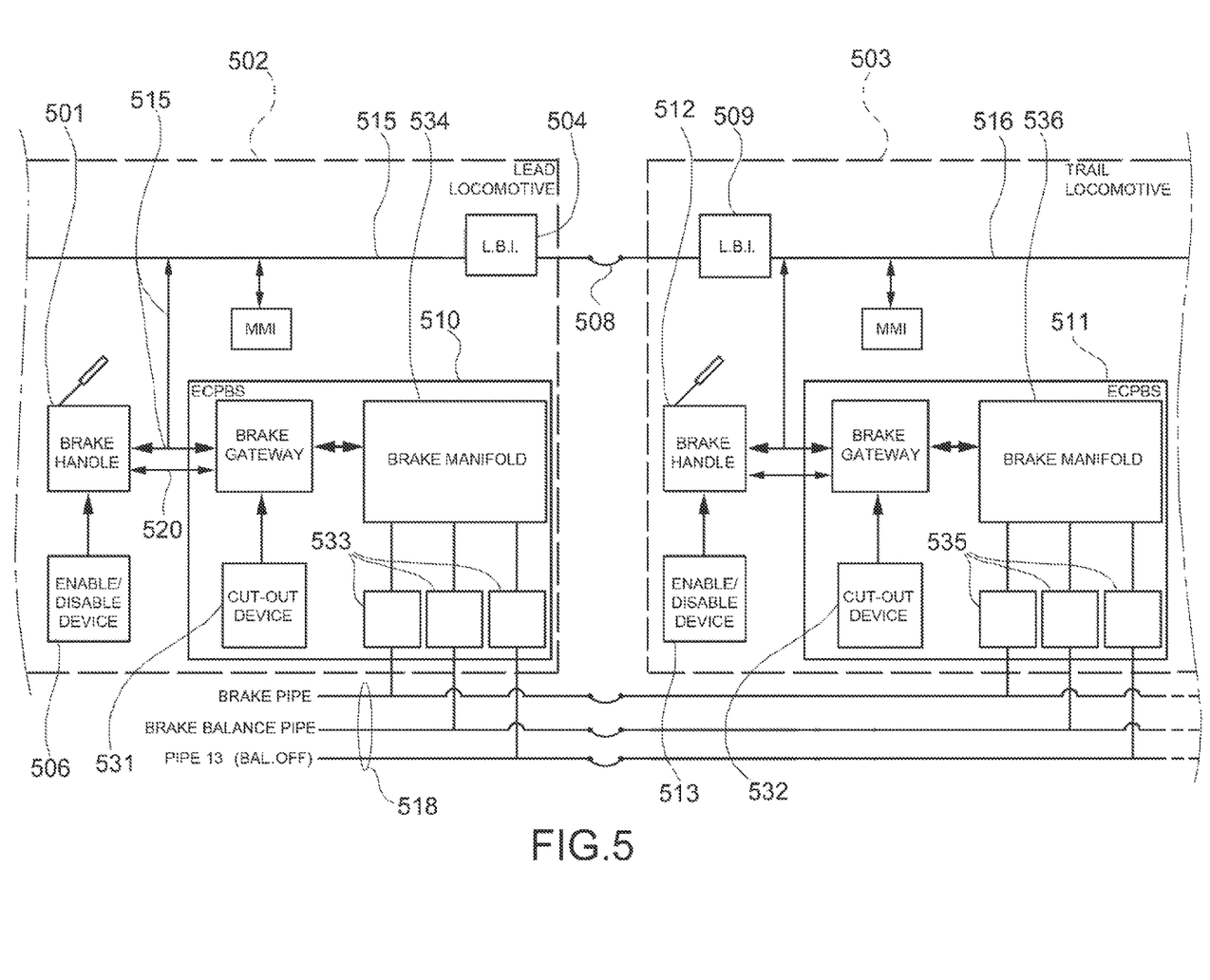
FIG. 5 is a block diagram showing an enhanced variant of embodiment of the ECPBS of FIG. 4.

Embodiment of FIG. 5

FIG. 5 shows an enhanced variant of the brake system shown in FIG. 4: the communication link between the brake handle 501 and the ECPBS 510 is made redundant by adding a communication link 520 in parallel to link 515.

Compared with FIG. 4, when a failure on the communication link 415 would prevent the train operator from controlling both the ECPBSs 410 and 411, the architecture shown in FIG. 5 allows the train operator to control the ECPBS 510 even if communication link 515 is in irreparable, permanent failure. In summary, the architecture shown in FIG. 5 provides the train consist with full electropneumatic brake redundancy up to the level of the brake handle 501.

In the variant shown in FIG. 5 the brake handle 501, available in the lead locomotive 502, physically forwards brake commands to the ECPBS 510 in the lead locomotive and to the locomotive brake interface 504 through communication link 515. In addition, the brake handle 501 forwards redundant brake commands to the ECPBS 510 of the lead locomotive through the additional communication link 520, which is for example a LON network, or a CAN network, or an encoded digital signal network, or an analog signal network. An enable/disable device 506, such as a switch, is used to enable or disable the brake handle 501, allowing or preventing it from delivering brake commands on both the communication links 515 and 520. Thus, the redundancy of communication links 515 and 520 allows the brake command delivery from brake handle 501 to ECPBS 510 to be single-fault tolerant.

Figure 6:
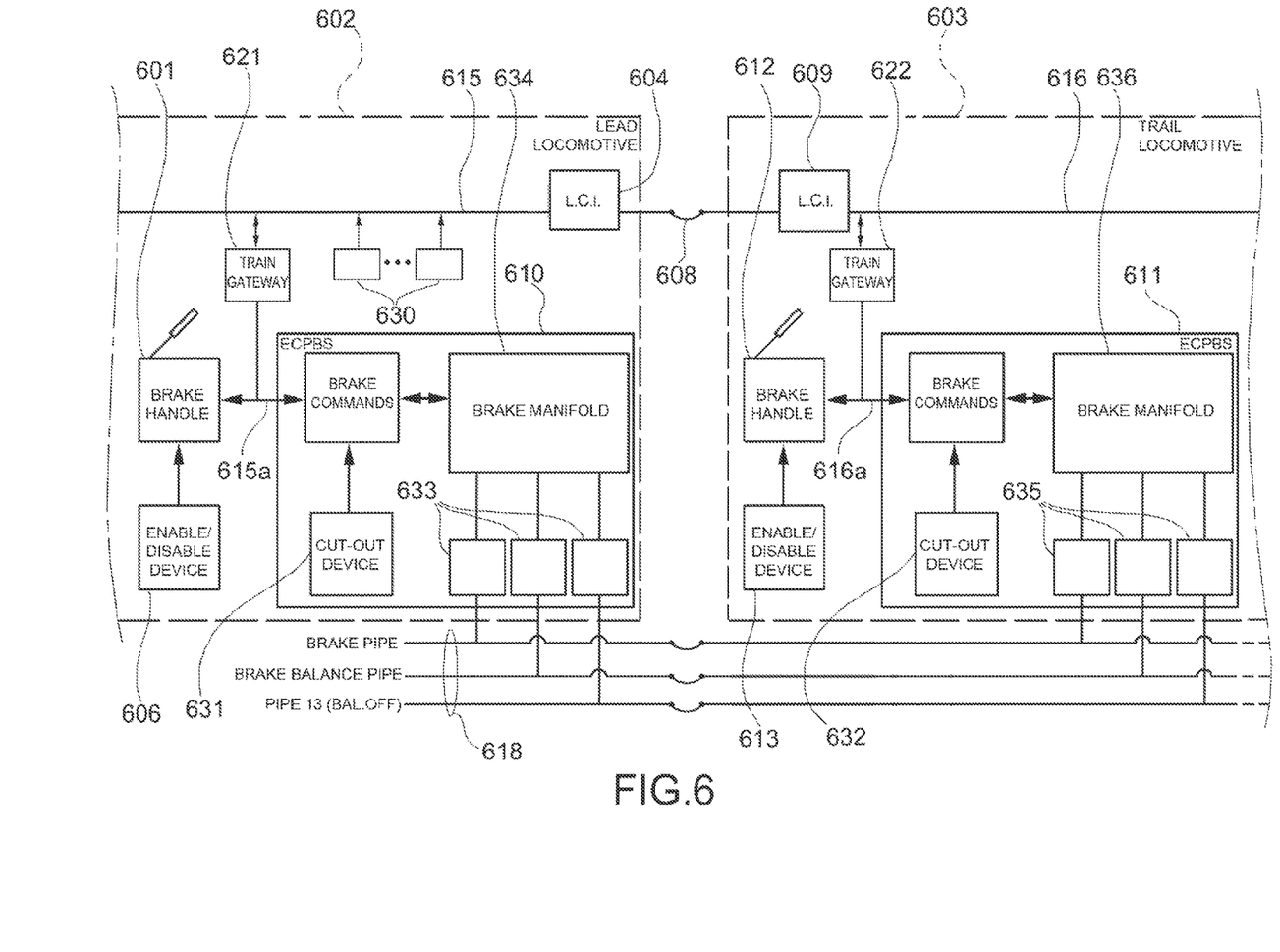
FIG. 6 shows another variant of embodiment of the ECPBS of FIG. 4.

Embodiment of FIG. 6

FIG. 6 shows an adaptation of the architecture of FIG. 4 for the case in which a locomotive communication network is available in the locomotive consist. Such a locomotive communication network can be available to connect intelligent modules 630 (such as, for example, bus administrators, MMIs, traction control modules, event recorders, etc.) and comprises communication links 615 and 616, locomotive communication interfaces 604 and 609 and locomotive interconnection cable 608.

The brake handle 601 can forward brake commands to the ECPBS 611 in the trail locomotive 603 through said locomotive communication network. Adaptation and synchronization of the protocol of the communication links 615 and 616 to the locomotive communication network protocol is performed by train gateways 621 and 612.

The communication layer in FIG. 6 comprises communication links 615 and 616, train gateways 621 and 622, locomotive communication interfaces 604 and 609, and locomotive interconnection cable 608.

According to the architecture shown in FIG. 6, like in FIG. 4 the train operator can control the braking pipe pressures from the brake handle 601 in the lead locomotive, by controlling the ECPBS 611, should the ECPBS 610 in the lead locomotive irreparably fail.

FIG. 6 shows the lead locomotive 602 provided with a locomotive data bus 615. The locomotive data bus 615 is in charge of interfacing the on board intelligent modules 630.

The locomotive data bus 615 is coupled to the locomotive data bus 616 in the trail locomotive 603, through locomotive communication interfaces 604 and 609 and inter-car bus connection 608.

According to the present invention, in the architecture shown in FIG. 6 the brake handle 601 in the lead locomotive 602 physically forwards brake commands to the ECPBS 610 of the lead locomotive, and to the train gateway 621, through a communication link 615a.

An enable/disable device 606 is used to enable or disable the brake handle 601, allowing or preventing it from delivering brake commands on the communication link 615a.

The train gateway 621 transfers to brake commands generated by the brake handle 601 from the communication link 615a to the locomotive data bus 615 according to the related existing communication protocol. In such a way the brake commands will be issued to the train gateway 622 in the trail locomotive 603 through the locomotive communication interfaces 604 and 609, the inter-car bus connection 608 and the locomotive data bus 615, according to the prevailing communication protocol.

The train gateway 622 transfers the brake commands from the locomotive data bus 616 to a communication link 616a.

In the trail locomotive 603 a brake handle 612 is connected to the communication link 616a. An enable/disable device 613 is used to allow or prevent the brake handle 612 to deliver brake commands on the communication link 616a.

In the lead locomotive 602 an active cut-out device 631 is used to enable or disable the ECPBS 610 to perform the brake commands issued over the communication link 615a.

Similarly, in the trail locomotive 603 an active cut-out device 632 is used to enable or disable the ECPBS 611 to perform the brake commands received through the communication link 616a.

In the lead locomotive 603 one or more pneumatic devices, such as pneumatic cocks or pneumatic valves, are used to connect or isolate the brake manifold 634 from one of more brake pneumatic pipes 618.

In the trail locomotive 603 one or more pneumatic devices 635 are similarly used to connect or isolate the brake manifold 636 from one or more of the brake pneumatic pipes 618.

Still with reference to FIG. 6, when the ECPBS 610 in the lead locomotive 602 is fully operable, exempt from failures that could prevent the train consist from properly operating, the enable/disable device 606 is set to enable the brake handle 601 to deliver brake commands over the communication link 615a, the active cut-out device is set to enable the ECPBS 610 to operate upon brake commands issued by the brake handle 601 over the communication link 615a; the pneumatic devices 633 are set in the condition in which they connect the brake manifold 634 to the brake pneumatic pipes 618 allowing the ECPBS 610 to properly control the braking pressures corresponding to brake commands issued by the brake handle 601, and the enable/disable device 613 is set to disable the brake handle 612 to prevent it from delivering brake commands over the communication link 616a; the active cut-out device 632 is set to disable the ECPBS 611, preventing it from operating upon brake commands received over the communication links 616a; the pneumatic devices 635 are set in the condition in which they isolate the brake manifold 636 from the brake pneumatic pipes 618, preventing the ECPBS 611 from influencing the pressures in said pipes 618.

According to the present invention, and as shown in FIG. 6, when the ECPBS 610 in the lead locomotive 602 is affected by one or more failures which prevent the train consist from properly operating, the enable/disable device 606 is set to enable the brake handle 601 to deliver brake commands over the communication link 615a, and the active cut-out device 631 is set to disable the ECPBS 610 preventing it from operating according to the brake commands issued from the brake handle 601 over the communication link 615a; the pneumatic devices 633 are set in the condition in which they isolate the brake manifold 634 from the brake pneumatic pipes 618, preventing the ECPBS 610 from influencing the pressures in said pipes. In the trail locomotive 603 the enable/disable device 612 is set to disable the brake handle 612 preventing it from delivering brake commands over the communication link 616a; the active cut-out device 632 is set to enable the ECPBS 611 to operate according to brake commands received over the communication link 616a; the pneumatic devices 635 are set in the condition in which they connect the brake manifold 636 to the brake pneumatic pipes 618, allowing the ECPBS 611 to control the pressures in the brake pneumatic pipes 618 according to the brake commands received from the brake handle 601 through the communication link 615a, the train gateway 621, the locomotive data bus 615, the locomotive communication interface 604, the inter-car connection 608, the locomotive communication interface 609, the locomotive data bus 616, the train gateway 622 and the communication link 616a.

Figure 7:
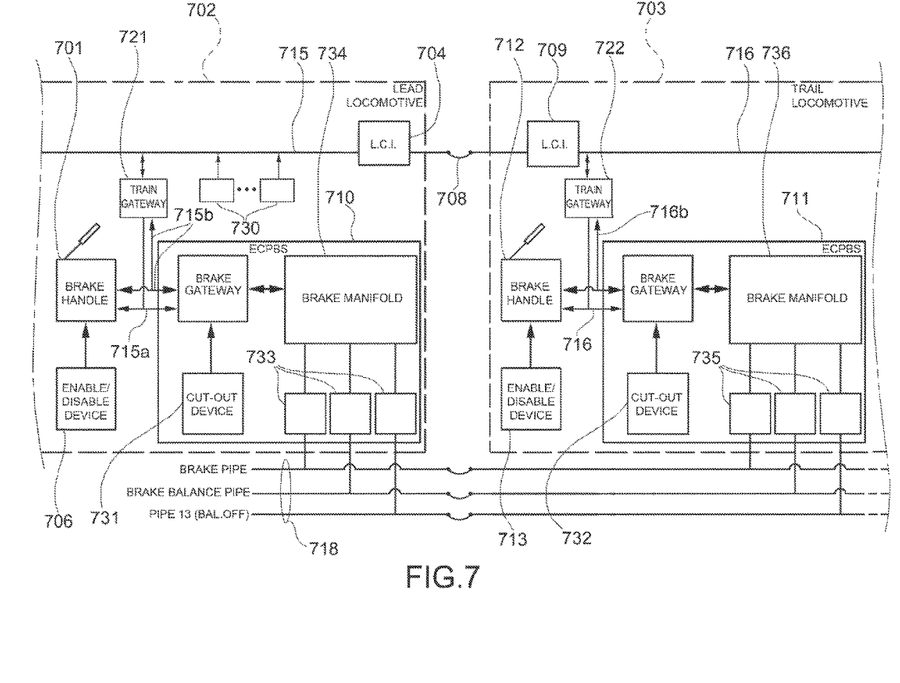
FIG. 7 shows an improved variant of the ECPBS of FIG. 6.

Embodiment of FIG. 7

FIG. 7 shows an enhancement of the system shown in FIG. 6: in the lead locomotive 702 the communication link between the brake handle 701 and the ECPBS 710 is made redundant by adding a communication link 715b in parallel to the communication link 715a. Compared with FIG. 6, when a failure in the communication link 615a would prevent the train operator from controlling both the ECPBSs 610 and 611, the architecture shown in FIG. 7 allows the train operator to control the ECPBS 711 even in case communication link 715a is in irreparable permanent failure. In summary, the architecture shown in FIG. 7 provides the train consist with full electro-pneumatic brake redundancy up to brake handle 701.

According to the invention, in the variant shown in FIG. 7 the brake handle 701 in the lead locomotive 702 physically forwards brake commands to the ECPBS 710 and train gateway 721 through two independent communication links 715a and 715b. The redundancy of communication links 715a and 715b allows the brake command delivery from brake handle 701 to ECPBS 710 to be single-fault tolerant.

Brake Handle Design

The control architecture shown in FIG. 5 involves using a brake handle 501 capable of providing brake commands on independent communication links 515 and 520. Also the control architecture shown in FIG. 7 involves using a brake handle 701 capable of providing brake commands on independent communication links 715a and 715b.

Figure 8:
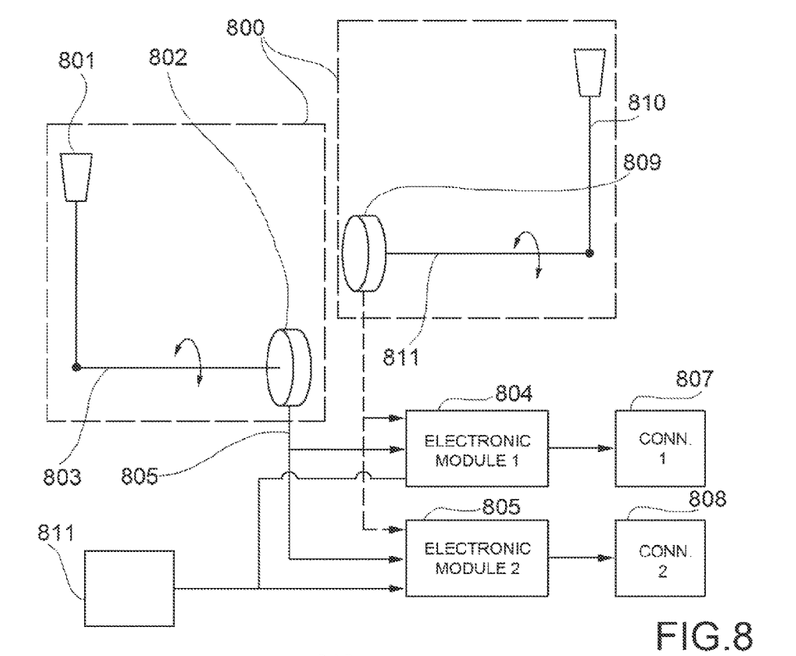
FIG. 8 is a block diagram of an embodiment of a brake control handle device suited for use with the systems of FIGS. 5 and 7.

FIG. 8 shows a possible implementation of a brake handle suitable to furthermore improve the redundancy provided by the architectures shown in FIGS. 5 and 7.

According to FIG. 8 a brake handle 501/701 includes an electromechanical arrangement 808, wherein a lever 801 is mechanically coupled through a shaft 803 with an angular position sensor or encoder 802, such as a potentiometer or an optical encoder or a magnetic encoder. The angular encoder 802 is connected to two independent electronic modules 804 and 805 through an electrical connection 806.

The electronic modules 804 and 805 are predisposed to convert the electrical signals provided by the encoder 802 into proper brake commands to be issued on the communication links 515, 520 or 715a, 715b.

Each of the electronic modules 804 and 805 can convert the signals from more than one angular encoder, for instance also the signals from an additional angular encoder 809, should the brake handle be provided with more than one operating lever, such as the additional lever indicated 810 in FIG. 8.

Auxiliary functional switches 811 can be provided in the brake handle, connected to the electronic modules 804 and 815.

The electronic modules 804 and 815 are coupled to respective connectors 807 and 808, which are coupled with the corresponding communication links connected to the brake handle.

Figure 9:
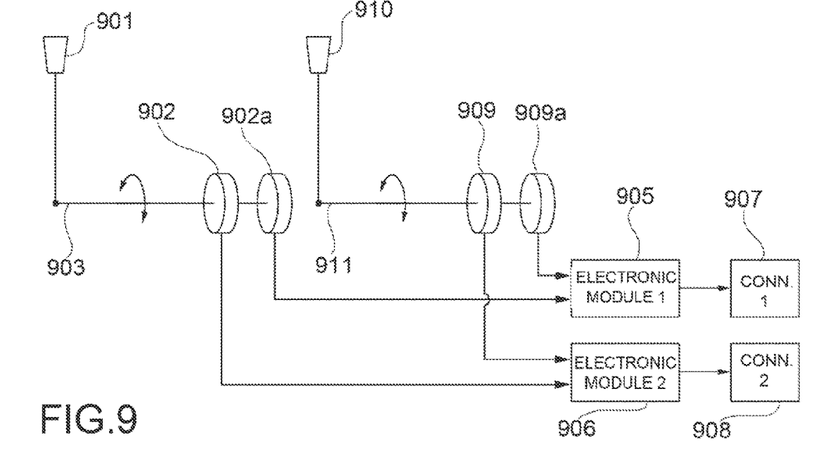
FIG. 9 shows a variant of embodiment of the brake control handle device of FIG. 8.

FIG. 9 shows an enhancement of the brake handle device described with reference to FIG. 8.

In the variant of FIG. 9 brake control lever 901 is coupled to two angular encoders 902, 902*a* through a same shaft 903. The encoders 902, 902*a* are respectively connected to independent electronic modules 905, 906, which are coupled to respective electrical connectors 907, 908.

If the brake handle is provided with more than one operating lever, for instance also with an additional lever 910, the same encoder redundancy is reproduced also for the additional lever 910, which is thus provided with angular encoders 909, 909*a*.

The variant of FIG. 9 provides complete electronic redundancy, so that the resulting brake handle is single-fault redundant.

What is claimed is:

1. A pneumatic braking system of a train consist comprising a lead locomotive and at least one adjacent trail locomotive, followed by a plurality of cars, the pneumatic breaking system comprising:
a pneumatic train brake pipe that extends through the whole train consist; and
a communication network connecting said lead locomotive to said at least one adjacent trail locomotive, wherein:
the lead locomotive comprises:
a first electronically controlled pneumatic brake system (ECPBS) connected to the pneumatic train brake pipe, said first ECPBS being configured to control a braking pressure in said train brake pipe, wherein said first ECPBS comprises:
a first brake manifold;
first pneumatic devices configured to connect or isolate said first brake manifold from said train brake pipe; and
first connection circuitry configured to enable or disable the first ECPBS to operate upon braking commands received through the communication network; and
a first manually operable brake control handle device configured to control the first connection circuitry to enable or disable the first ECPBS and generate braking commands to be delivered to an ECPBS through the communication network, said braking commands being configured to control, by means of said ECPBS, the braking pressure in said brake pipe,
the at least one adjacent trail locomotive comprises:
a second ECPBS connected to the pneumatic train brake pipe, said second ECPBS being configured to control the braking pressure in said train brake pipe, wherein said second ECPBS comprises:
a second brake manifold;
second pneumatic devices configured to connect or isolate said second brake manifold from said train brake pipe; and
second connection circuitry configured to enable or disable the second ECPBS to operate upon braking commands received through the communication network in response to a selection control signal received from the first manually operable brake handle to enable or disable the second ECPBS,
said communication network extends through the lead locomotive and said at least one trail locomotive of the consist for delivering the braking commands from the brake control handle device of the lead locomotive to the second ECPBS of said at least one trail locomotive, to control the braking pressure in said brake pipe also by means of the second ECPBS of said at least one trail locomotive in accordance with the braking commands generated by the brake control handle device of the lead locomotive, and
said pneumatic braking system is configured to operate in:
a normal operation mode in which the first ECPBS operates without failure, the first connection circuitry is configured to enable the first ECPBS to operate in accordance with the braking commands generated by the first manually operable brake control handle device received via said communication network, the first pneumatic devices are configured to connect said first brake manifold to said train brake pipe, the second connection circuitry is configured to disable the second ECPBS to operate in accordance with the braking commands generated by the first manually operable brake control handle device received via said communication network, and the second pneumatic devices are configured to isolate said second brake manifold from said train brake pipe, and
a failure operation mode in which the first ECPBS improperly operates due to failure, the first connection circuitry is configured to disable the first ECPBS to operate in accordance with the braking commands generated by the first manually operable brake control handle device received via said communication network, the first pneumatic devices are configured to isolate said first brake manifold from said train brake pipe, the second connection circuitry is configured to enable the second ECPBS to operate in accordance with the braking commands generated by the first manually operable brake control handle device received via said communication network, and the second pneumatic devices are configured to connect said second brake manifold to said train brake pipe.

2. The pneumatic braking system of claim 1, wherein said at least one trail locomotive further comprises:
a second manually operable brake control handle device configured to generate the braking commands to be delivered to the ECPBS through the communication network; and
means for enabling and disabling the second manually operable brake control handle device, to allow and prevent said second manually operable brake control handle device from issuing the brake commands over said communication network.

3. The pneumatic braking system of claim 1, wherein said at lead locomotive further comprises:
means for enabling and disabling the first manually operable brake control handle device to allow and prevent said first manually operated brake control lever device from issuing the brake commands over said communication network.

4. The pneumatic braking system of claim 1, wherein said at lead locomotive further comprises:
a man-machine interface connected to said communication network, arranged to display operating values, including the braking pressure in said train break pipe, provided by the first ECPBS of said lead locomotive in the normal operation mode and the second ECPBS of said trail locomotive in the failure operation mode.

\* \* \* \* \*